(12) United States Patent
Vijayan Retnamma et al.

(10) Patent No.: US 7,536,291 B1
(45) Date of Patent: May 19, 2009

(54) SYSTEM AND METHOD TO SUPPORT SIMULATED STORAGE OPERATIONS

(75) Inventors: Manoj Kumar Vijayan Retnamma, Marlboro, NJ (US); Ho-Chi Chen, Marlboro, NJ (US); Zahid Ilkal, Ocean, NJ (US); Rajiv Kottomtharayil, Marlboro, NJ (US)

(73) Assignee: CommVault SYstems, Inc., Oceanport, NJ (US)

( * ) Notice: Subject to any disclaimer, the term of this patent is extended or adjusted under 35 U.S.C. 154(b) by 551 days.

(21) Appl. No.: 11/269,136

(22) Filed: Nov. 8, 2005

Related U.S. Application Data

(60) Provisional application No. 60/626,076, filed on Nov. 8, 2004.

(51) Int. Cl.
G06F 9/44 (2006.01)
(52) U.S. Cl. .................... 703/21; 703/23; 711/112; 711/114; 709/220; 709/231; 710/62
(58) Field of Classification Search ............. 703/23, 703/21; 709/220, 246, 231; 707/204; 360/97.01; 714/2; 713/201; 702/186; 710/60; 711/115
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |

(Continued)

FOREIGN PATENT DOCUMENTS

EP 0259912 3/1988

(Continued)

OTHER PUBLICATIONS

U.S. Appl. No. 11/269,521.

(Continued)

*Primary Examiner*—Paul L Rodriguez
*Assistant Examiner*—Kandasamy Thangavelu
(74) *Attorney, Agent, or Firm*—Knobbe, Martens, Olson & Bear, LLP

(57) ABSTRACT

The present invention includes a system for simulating the performing of data storage operations. The system may include a storage manager component, at least one media management component directed by the storage manager component to manage storage operations to at least one storage device, and a storage emulation module adapted to simulate the characteristics of the at least one storage device. Under the direction of the storage manager, the emulation module may be adapted to simulate storage operations to one or more storage devices performed by one or more of the media management components.

20 Claims, 7 Drawing Sheets

U.S. PATENT DOCUMENTS

| | | | |
|---|---|---|---|
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,829,023 A | 10/1998 | Bishop | |
| 5,890,159 A | 3/1999 | Sealby et al. | |
| 6,167,402 A | 12/2000 | Yeager | |
| RE37,601 E | 3/2002 | Eastridge et al. | |
| 6,374,266 B1* | 4/2002 | Shnelvar | 707/204 |
| 6,385,673 B1* | 5/2002 | DeMoney | 710/60 |
| 6,791,910 B1 | 9/2004 | James et al. | |
| 6,859,758 B1* | 2/2005 | Prabhakaran et al. | 702/186 |
| 7,035,880 B1 | 4/2006 | Crescenti et al. | |
| 7,069,380 B2 | 6/2006 | Ogawa et al. | |
| 7,117,246 B2 | 10/2006 | Christenson et al. | |
| 7,130,970 B2 | 10/2006 | Devassy et al. | |
| 7,155,633 B2 | 12/2006 | Tuma et al. | |
| 7,159,110 B2 | 1/2007 | Douceur et al. | |
| 7,246,272 B2 | 7/2007 | Cabezas et al. | |
| 7,287,252 B2 | 10/2007 | Bussiere et al. | |
| 2002/0004883 A1 | 1/2002 | Nguyen et al. | |
| 2002/0029281 A1 | 3/2002 | Zeidner et al. | |
| 2002/0040405 A1* | 4/2002 | Gold | 709/231 |
| 2002/0069369 A1* | 6/2002 | Tremain | 713/201 |
| 2002/0194340 A1 | 12/2002 | Ebstyne et al. | |
| 2003/0014433 A1 | 1/2003 | Teloh et al. | |
| 2003/0016609 A1 | 1/2003 | Rushton et al. | |
| 2003/0169733 A1 | 9/2003 | Gurkowski et al. | |
| 2003/0188114 A1 | 10/2003 | Lubbers et al. | |
| 2004/0010487 A1 | 1/2004 | Prahlad et al. | |
| 2004/0073716 A1 | 4/2004 | Boom et al. | |
| 2004/0088432 A1* | 5/2004 | Hubbard et al. | 709/246 |
| 2005/0033800 A1 | 2/2005 | Kavuri et al. | |
| 2005/0039051 A1* | 2/2005 | Erofeev | 713/201 |
| 2005/0044114 A1 | 2/2005 | Kottomtharayil et al. | |
| 2005/0044316 A1* | 2/2005 | Kottomtharayil et al. | 711/115 |
| 2005/0114406 A1 | 5/2005 | Borthakur et al. | |
| 2005/0114477 A1* | 5/2005 | Willging et al. | 709/220 |
| 2005/0144520 A1 | 6/2005 | Tuma et al. | |
| 2005/0166011 A1 | 7/2005 | Burnett et al. | |
| 2005/0172093 A1 | 8/2005 | Jain | |
| 2005/0246568 A1* | 11/2005 | Davies | 714/2 |
| 2005/0256972 A1 | 11/2005 | Cochran et al. | |
| 2005/0262296 A1 | 11/2005 | Peake | |
| 2006/0044674 A1* | 3/2006 | Martin et al. | 360/97.01 |
| 2006/0224846 A1 | 10/2006 | Amarendran et al. | |
| 2006/0224852 A1 | 10/2006 | Kottomtharayil et al. | |
| 2006/0230244 A1 | 10/2006 | Amarendran et al. | |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| WO | WO-95/13580 | 5/1995 |
| WO | WO-99/12098 | 3/1999 |
| WO | WO 99/14692 | 3/1999 |
| WO | WO 2005/055093 | 6/2005 |

OTHER PUBLICATIONS

U.S. Appl. No. 11/269,520.
U.S. Appl. No. 11/269,519, Kavuri et al.
U.S. Appl. No. 11/269,515.
U.S. Appl. No. 11/269,513.
U.S. Appl. No. 11/269,119, Amarendran et al.
Armstead et al., "Implementation of a Campus-wide Distributed Mass Storage Service: The Dream vs. Reality," *IEEE*, 1995, pp. 190-199.
Arneson, David A., Control Data Corporation, *Development of Omniserver*; Mass Storage Systems, 1990, pp. 88-93.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," *IEEE*, 1994, pp. 124-126.
Jander, M., "Launching Storage-Area Net," *Data Communications*, US, McGraw Hill, NY, vol. 27, No. 4 (Mar. 21, 1998), pp. 64-72.
Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).
Rosenblum et al., "The Design and Implementation of a Log-Structured File System," *Operating Systems Review SIGOPS*, vol. 25, No. 5, New York, US, pp. 1-15 (May 1991).

* cited by examiner

SYSTEM AND METHOD TO SUPPORT SIMULATED STORAGE OPERATIONS

PRIORITY CLAIM AND RELATED APPLICATIONS

This application claims the benefit of U.S. provisional application No. 60/626,076 titled SYSTEM AND METHOD FOR PERFORMING STORAGE OPERATIONS IN A COMPUTER NETWORK, filed Nov. 8, 2004, which is incorporated herein by reference in its entirety.

This application is related to the following patents and pending applications, each of which is hereby incorporated herein by reference in its entirety:

- application Ser. No. 11/269,520, titled System and Method for Performing Multistream Storage Operations, filed Nov. 7, 2005;
- application Ser. No. 11/269,512, titled System and Method to Support Single Instance Storage Operations, filed Nov. 7, 2005;
- application Ser. No. 11/269,514, titled Method and System of Pooling Storage Devices, filed Nov. 7, 2005;
- application Ser. No. 11/269,521, titled Method and System for Selectively Deleting Stored Data, filed Nov. 7, 2005;
- application Ser. No. 11/269,519, titled Method and System for Grouping Storage System Components, filed Nov. 7, 2005;
- application Ser. No. 11/269,515, titled Systems and Methods for Recovering Electronic Information From a Storage Medium, filed Nov. 7, 2005;
- application Ser. No. 11/269,513, titled Method and System for Monitoring a Storage Network, filed Nov. 7, 2005; and
- application Ser. No. 11/269,119, titled System and Method for Enhancing Auxiliary Storage Operation, filed Nov. 8, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to performing storage operations in a computer network. More particularly, the present invention relates to performing simulated storage operations in a storage management system.

Storage management systems have evolved into complex entities with many components including hardware and software modules designed to perform a variety of different storage operations on electronic data. In some instances, users may wish to simulate storage operations to particular hardware. For example, a network engineer or sales person may wish to demonstrate capabilities of a storage management system without going to the trouble of installing and configuring one or more of the many pieces of hardware that are part of today's complex storage management systems. Many components of storage management systems may be software modules, which may easily be installed on a laptop or other computing device. Without attaching and configuring additional hardware components required by the system to perform storage operations, users cannot generally test or otherwise demonstrate the software modules that also make up a storage management system.

Thus, there is a need for performing simulated storage operations without the added requirement of utilizing storage media hardware.

BRIEF SUMMARY OF THE INVENTION

The invention may include systems and methods for performing simulated storage operations on electronic data. Data structures and other schema may be used to present software modules with simulated interfaces for various hardware components that may not be physically present in the system. Thus, software modules may perform storage operations, direct data, and otherwise interface with the simulated hardware represented by data structures and schemas. Software modules interface with a simulated hardware interface that reads the information contained in the data structures and schemas to present a virtually identical interface of a storage device and mimic the behavior of a storage device. The data structures and schemas contain various information, which may include, among other things, characteristics, attributes, and functionality associated with simulated hardware storage devices and other components associated with a storage operation system.

According to an embodiment of the invention, a system for simulating the performing of data storage operations is provided. The system may comprise a storage manager component and one or more media management components configured to perform storage operations on one or more storage devices under the direction of the storage manager component. A storage emulation module adapted to simulate the characteristics of the one or more storage devices may, under the direction of the storage manager, simulate storage operations on the one or more storage devices performed by the one or more media management components.

According to another embodiment of the invention, a method of simulating data storage operations is provided. The method comprises accessing one or more electronic files comprising information associated with a storage device and selecting a media management component associated with the accessed one or more electronic files. The electronic data is transferred from a computer device to the media management component, where a storage operation is simulated between the media management component and the storage device based on the accessed one or more electronic files.

According to yet another embodiment of the invention, a method of simulating data storage operations implemented by a computer device is provided. The method comprises accessing, at the computer, a program interface associated with simulating storage operations. At the computer, information associated with one or more storage devices is determined via the program interface. At the computer, one or more media management components are assigned to each of the one or more storage devices via the program interface, where under the direction of a storage manager component, data storage operation are simulated based on the assigned media management component and the determined information.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
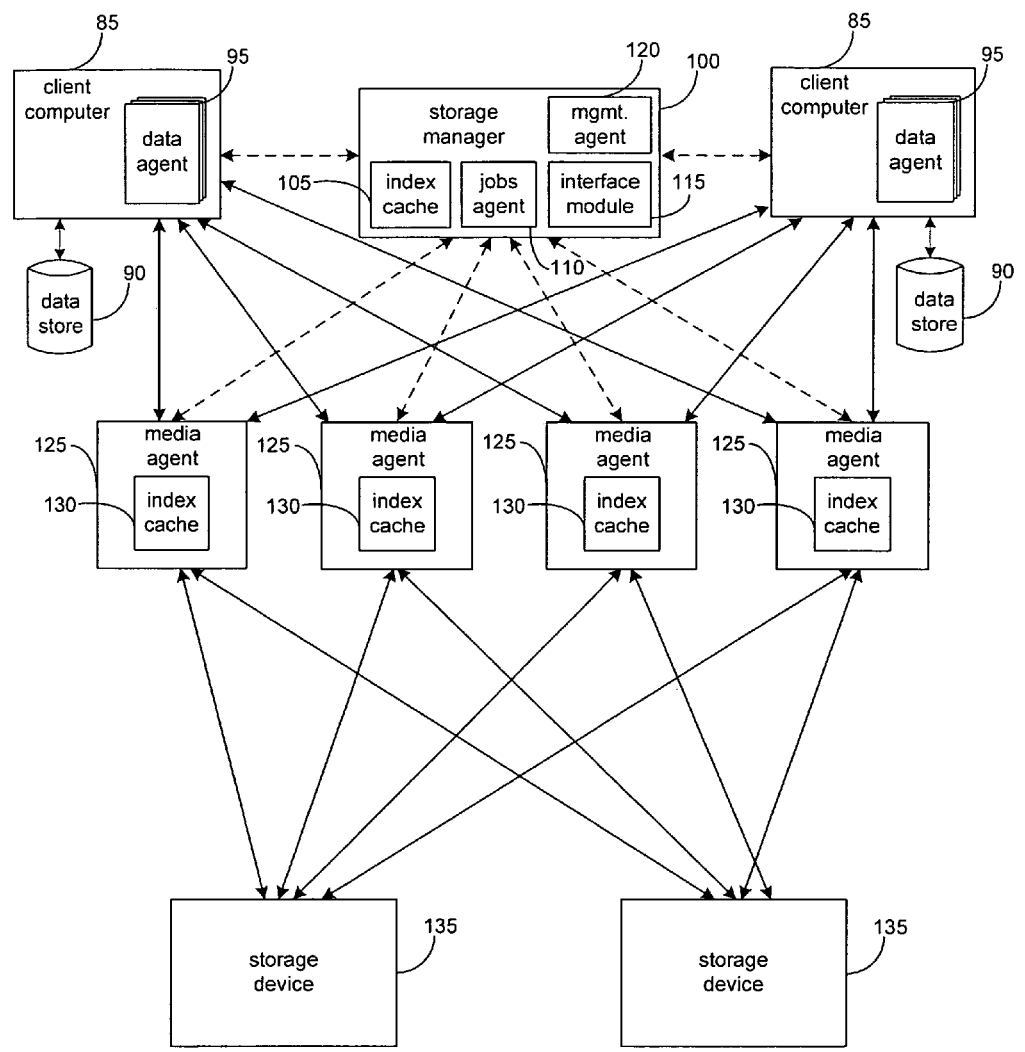
FIG. 1 is a block diagram of a storage operation cell in a system to perform storage operations on electronic data in a computer network according to an embodiment of the invention.

FIG. 1 presents a block diagram of a storage operation cell in a system to perform storage operations on electronic data in a computer network according to an embodiment of the invention. As shown, the storage operation cell includes a storage management component, such as storage manager 100 and one or more of the following: a client 85, a data store 90, a data agent 95, a media management component, such as a media agent 125, a media management component index cache 130, a storage device 135, a storage management component index cache 105, a jobs agent 110, an interface module 115, and a management agent 120. The system and elements thereof are exemplary of a modular storage management system such as that further described in application Ser. No. 09/610,738, which is incorporated herein by reference in its entirety. A storage operation cell may generally include combinations of hardware and software components directed to performing storage operations on electronic data. Exemplary storage operation cells according to embodiments of the invention include CommCells as embodied in the QNet storage management system and the QiNetix storage management system by CommVault Systems of Oceanport, N.J., and as further described in Application Serial No. 60/482,305 and application Ser. No. 09/354,058 which are hereby incorporated by reference in their entirety.

Storage operations cells may be related to backup cells and may provide all of the functionality of backup cells as further described in application Ser. No. 09/354,058. Storage operation cells may also perform additional types of storage operations and provided by other types of storage management functionality. Storage operation cells performing storage operations may also include, but are not limited to, creation, storage, retrieval, migration, deletion, and tracking of primary or production volume data, secondary volume data, primary copies, secondary copies, auxiliary copies, snapshot copies, backup copies, incremental copies, differential copies, Hierarchical Storage Management ("HSM") copies, archive copies, Information Lifecycle Management ("ILM") copies, and other types of copies and versions of electronic data. Storage operation cells may also include an integrated management console for providing users or system processes to interface with, in order to perform storage operations on electronic data.

A storage operation cell may be organized and associated with other storage operation cells by forming a logical hierarchy among various components of a storage management system. Storage operation cells generally include a storage manager 100, and, one or more other components including, but not limited to, a client computer 85, a data agent 95, a media management component 125, a storage device 135, such as a single instance storage device, and other components.

For example, a storage operation cell may contain a data agent 95 which may generally be a software module that is responsible for performing storage operations related to client computer 85 data that may be stored in data store 90 or another memory location. For example, data agent 95 may provide archiving, migrating, and recovery of client computer data. A data agent may perform storage operations in accordance with one or more storage policies or other preferences. A storage policy is generally a data structure or other information which includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Storage policies may be stored to a storage manager index, to archive media as metadata for use in restore operations or other storage operations, or to other locations or components of the system.

Each client computer 85 generally has at least one data agent 95 and the system may support many client computers 85. The system may also generally provide a plurality of data agents 95 each of which may intend to perform storage operations related to data associated with a different application, for example, in order to backup, migrate, and recover application specific data. For example, different individual data agents 95 may be designed to handle MICROSOFT EXCHANGE data, LOTUS NOTES data, MICROSOFT WINDOWS 2000 file system data, MICROSOFT ACTIVE DIRECTORY OBJECTS data, and other types of data known in the art.

If a client computer 85 includes two or more types of data, one data agent 95 may generally be required for each data type in order to perform storage operations related to client computer 85 data. For example, to backup, migrate, and restore all of the data on a MICROSOFT EXCHANGE 2000 server, the client computer 85 would use one MICROSOFT EXCHANGE 2000 mailbox data agent 95 to backup the EXCHANGE 2000 mailboxes, one MICROSOFT EXCHANGE 2000 database data agent 95 to backup the Exchange 2000 databases, one MICROSOFT EXCHANGE 2000 public folder data agent 95 to backup the EXCHANGE 2000 public folders, and one MICROSOFT WINDOWS 2000 file system data agent 95 to backup the client computer's 85 file system. These data agents 95 may be treated as four separate data agents 95 by the system even though they reside on the same client computer 85. Separate data agents may be combined to form a virtual data agent (not shown) for performing storage operations related to a specific application. Thus, the four separate data agents of the previous example may be combined as a virtual data agent suitable for performing storage operations related to all types of MICROSOFT EXCHANGE 2000 and/or WINDOWS 2000 data.

The storage manager 100 may generally be a software module or application that coordinates and controls storage operations performed by the storage operation cell. The storage manager 100 may communicate with all elements of the storage operation cell including client computers 85, data agents 95, media management components 125, and storage devices 135 regarding storage operations, for example, to initiate and manage system backups, migrations, and recoveries. The storage manager 100 may also communicate with other storage operation cells.

The storage manager 100 may include a jobs agent 110 software module which monitors the status of all storage operations that have been performed, that are being performed, or that are scheduled to be performed by the storage operation cell. The jobs agent 110 may be communicatively coupled with an interface agent 115 software module. The interface agent 115 may provide presentation logic, such as a graphical user interface ("GUI"), an application program interface ("API"), or other interface by which users and system processes may be able to retrieve information about the status of storage operations and issue instructions to the storage operations cell regarding the performance of storage operations. For example, a user may modify the schedule of a number of pending snapshot copies or other types of copies. As another example, a user may use the GUI to view the status of all storage operations currently pending in all storage operation cells or the status of particular components in a storage operation cell.

The storage manager 100 may also include a management agent 120 software module. The management agent 120 may generally provide an interface with other management components 100 in other storage operations cells through which information and instructions regarding storage operations may be conveyed. For example, a management agent 120 in a first storage operation cell can communicate with a management agent 120 in a second storage operation cell regarding the status of storage operations in the second storage operation cell. A management agent 120 in a first storage operation cell can communicate with a management agent 120 in a second storage operation cell to control the storage manager 100 (and other components) of the second storage operation cell via management agent 120 contained in the storage manager 100 of the second storage operation cell. The management agent 120 in the first storage operation cell may communicate directly with and control the components in the second storage management cell and bypasses the storage manager 100 in the second storage management cell. Storage operation cells can thus be organized hierarchically among cells.

A media management component 125 may be a software module that conducts data, as directed by a storage manager 100, between client computers 85 and one or more storage devices 135. The media management component 125 may communicatively be coupled with and generally configured to control one or more storage devices 135. For example, the media management component 125 may instruct a storage device 135 to use a robotic arm or other means to load or eject a media cartridge, and to archive, migrate, or restore application specific data. The media management component 125 may generally communicate with storage devices 135 via a local bus such as a SCSI adaptor. In some embodiments, the storage device 135 may be communicatively coupled to the media management component 125 via a Storage Area Network ("SAN").

Each media management component 125 may maintain an index cache 130 which stores index data the system generates during storage operations as further described herein. For example, storage operations for MICROSOFT EXCHANGE data generate index data. Index data may include, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data may thus provides the system with an efficient mechanism for performing storage operations including locating user files for recovery operations and for managing and tracking stored data. The system generally maintains two copies of the index data regarding particular stored data. A first copy may generally be stored with the data copied to a storage device 135. Thus, a tape may contain the stored data as well as index information related to the stored data. In the event of a system restore, the index data stored with the stored data may be used to rebuild a media management component index 130 or other index useful in performing storage operations. In addition, the media management component 125 that controls the storage operation may also write an additional copy of the index data to its index cache 130. The data in the media management component index cache 130 may be generally stored on faster media, such as magnetic media, and is thus readily available to the system for use in storage operations and other activities without having to be first retrieved from the storage device 135.

Storage manager 100 may also maintains an index cache 105. Storage manager index data may be used to indicate, track, and associate logical relationships and associations between components of the system, user preferences, management tasks, and other useful data. For example, the storage manager 100 may use its index cache 105 to track logical associations between media management components 125 and storage devices 135. The storage manager 100 may also use its index cache 105 to track the status of storage operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. Index caches 105 and 130 may typically reside on their corresponding storage component's hard disk or other fixed storage device.

For example, the jobs agent 110 of a storage manager component 100 may retrieve storage manager index 105 data regarding a storage policy and storage operation to be performed or scheduled for a particular client 85. Jobs agent 110, either directly or via the interface module 115, may communicate with the data agent 95 at the client 85 regarding the storage operation. In some embodiments, the jobs agent 110 may also retrieve from the index cache 105 a storage policy associated with the client 85 and uses information from the storage policy to communicate to the data agent 95 one or more media management components 125 associated with performing storage operations for that particular client 85 as well as other information regarding the storage operation to be performed, such as retention criteria, encryption criteria, streaming criteria, etc. The data agent 95 may then package or otherwise manipulate the client data stored in the client data store 90 in accordance with the storage policy information and/or according to a user preference, and communicates this client data to the appropriate media management component(s) 125 for processing. Media management component(s) 125 may store the data according to storage preferences associated with the storage policy including storing the generated index data with the stored data, as well as storing a copy of the generated index data in the media management component index cache 130.

In some embodiments, components of the system may reside and execute on the same computer. In some embodiments, a client computer 85 component such as a data agent 95, a media management component 125, or a storage manager 100 may coordinate and direct storage operations as further described in application Ser. No. 09/610,738. This client computer 85 component can function independently or together with other similar client computer 85 components.

Figure 2:
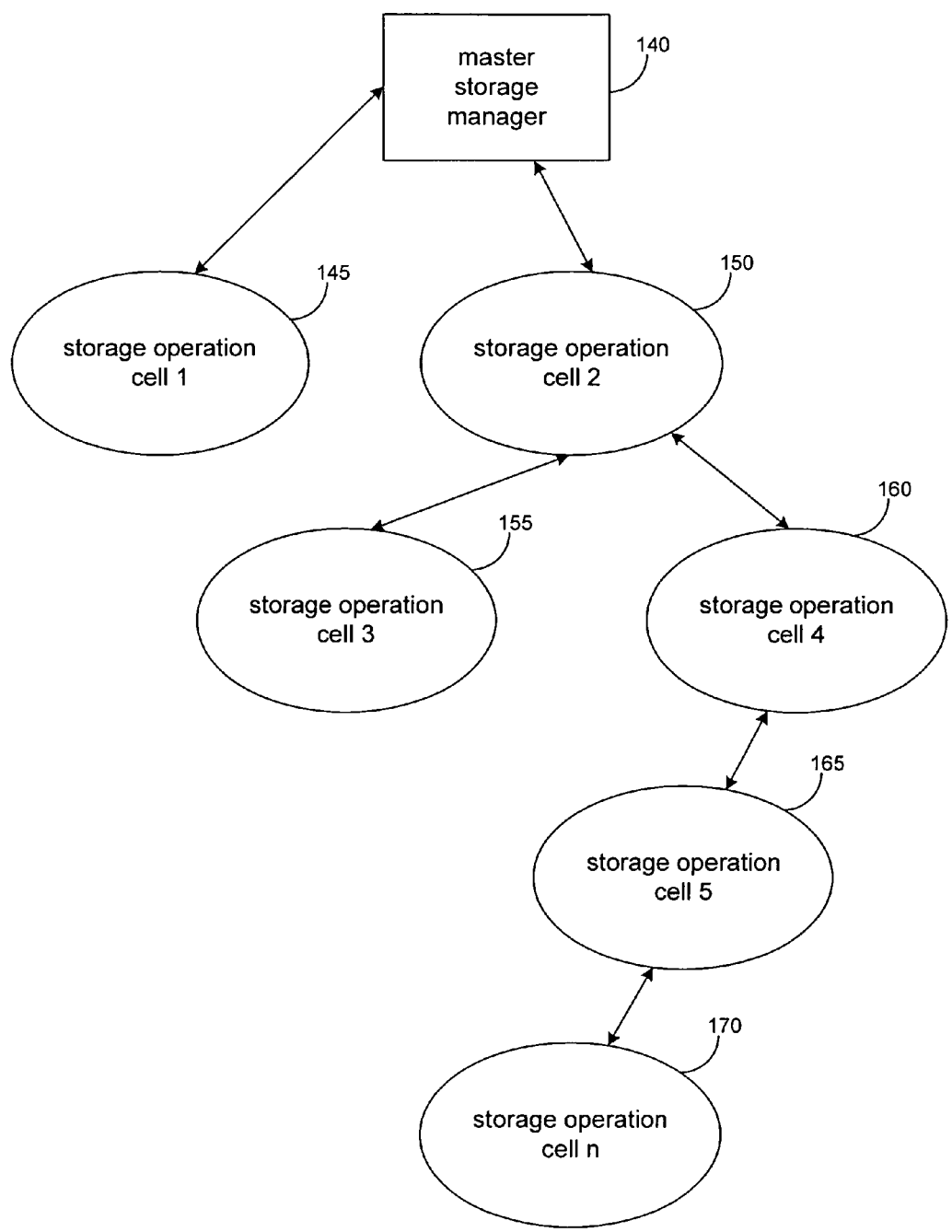
FIG. 2 is a block diagram of a hierarchically organized group of storage operation cells in a system to perform storage operations on electronic data in a computer network according to an embodiment of the invention.

FIG. 2 presents a block diagram of a hierarchically organized group of storage operation cells in a system to perform storage operations on electronic data in a computer network according to an embodiment of the invention. As shown, the system may include a master storage manager component 140, a first storage operation cell 145, a second storage operation cell 150, a third storage operation cell 155, a fourth storage operation cell 160, a fifth storage operation cell 165, and an nth storage operation cell 170.

As previously described, storage operation cells may often be communicatively coupled and hierarchically organized. For example, as shown in FIG. 2, master storage manager 140 may be associated with, communicates with, and directs storage operations for a first storage operation cell 145, a second storage operation cell 150, a third storage operation cell 155, a fourth storage operation cell 160, a fifth storage operation cell 165, and an nth storage operation cell 170. In some embodiments, master storage manager 140 may not be part of any particular storage operation cell. In other embodiments (not shown), master storage manager 140 may itself be part of a storage operation cell.

Thus, master storage manager 140 may communicate with the management agent of the storage manager of the first storage operation cell 145 (or directly with the other components of the first cell 145) regarding storage operations performed in the first storage operation cell 145. For example, in some embodiments, the master storage manager 140 may instruct the first storage operation cell 145 how and when to perform storage operations, including the type of operation to perform, and the data on which to perform the operation.

In other embodiments, master storage manager 140 may track the status of its associated storage operation cells, such as the status of jobs, system components, system resources, and other items, by communicating with manager agents (or other components) in the respective storage operation cells. In other embodiments, master storage manager 140 may track the status of its associated storage operation cells by receiving periodic status updates from the manager agents (or other components) in the respective cells regarding jobs, system components, system resources, and other items. For example, in some embodiments, master storage manager 140 may use methods to monitor network resources such as mapping network pathways and topologies to, among other things, physically monitor storage operations and suggest alternate routes for storing data as further described herein. The master storage manager 140 may also use methods to monitor primary and secondary storage trends, storage status, media usage, data protection levels, and other storage-related information as further described herein.

In some embodiments, master storage manager 140 may store status information and other information regarding its associated storage operation cells and the system in an index cache or other data structure accessible to the master storage manager 140. In some embodiments, as further described herein, the presentation interface of the master storage manager 140 accesses this information to present users and system processes with information regarding the status of storage operations, storage operation cells, system components, and other information of the system.

Storage operation cells may thus be organized hierarchically. Thus, storage operation cells may inherit properties from their parents or be controlled by other storage operation cells in the hierarchy. Thus, in some embodiments as shown in FIG. 2, the second storage operation cell 150 controls or is otherwise superior to the third storage operation cell 155, the fourth storage operation cell 160, the fifth storage operation cell 165, and the nth storage operation cell 170. Similarly, the fourth storage operation cell 160 controls the fifth storage operation cell 165, and the nth storage operation cell 170.

Storage operation cells may also be organized hierarchically according to criteria such as function, geography, architectural considerations, or other factors useful in performing storage operations. For example, in one embodiment storage operation cells may be organized according to types of storage operations: the first storage operation cell 145 may be directed to performing snapshot copies of primary copy data, and the second storage operation cell 150 is directed to performing backup copies of primary copy data or other data. For example, in another embodiment, the first storage operation cell 145 may represent a geographic segment of an enterprise, such as a Chicago office, and a second storage operation cell 150 represents a different geographic segment, such as a New York office. In this example, the second storage operation cell 150, the third storage operation cell 155, the fourth storage operation cell 160, the fifth storage operation cell 165, and the nth storage operation cell 170 may represent departments within the New York office. Alternatively, these storage operation cells may be further divided by function performing various types of copies for the New York office or load balancing storage operations for the New York office.

In some embodiments, hierarchical organization of storage operation cells facilitates, among other things, system security and other considerations. For example, in some embodiments, only authorized users may be allowed to access or control certain storage operation cells. For example, a network administrator for an enterprise might have access to all storage operation cells including the master storage manager 140. However, a network administrator for only the New York office, according to a previous example, may only satisfy access criteria for gaining access to the second storage operation cell 150, the third storage operation cell 155, the fourth storage operation cell 160, the fifth storage operation cell 165, and the nth storage operation cell 170 which may comprise the New York office storage management system.

In some embodiments, hierarchical organization of storage operation cells facilitates storage management planning and decision-making. For example, in some embodiments, a user of the master storage manager 140 may view the status of all jobs in the associated storage operation cells of the system as well as the status of each component in every storage operation cell of the system. The user can may then plan and make decisions based on this global data. For example, the user may view high-level reports of summary information regarding storage operations for the entire system, such as job completion status, component availability status, resource usage status (such as network pathways, etc.), and other information. The user may also drill down through menus or use other means to obtain more detailed information regarding a particular storage operation cell or group of storage operation cells.

In other embodiments, master storage manager 140 may alert the user when a particular resource is unavailable or congested. A storage device may be full or require additional media. Alternatively, a storage manager in a particular storage operation cell may be unavailable due to hardware failure, software problems, or other reasons. In some embodiments, master storage manager 140 (or another storage manager within the hierarchy of storage operation cells) may utilize the global data regarding its associated storage operation cells at its disposal to suggest solutions to such problems when they occur or even before they occur. For example, the master storage manager 140 might alert the user that a storage device in a particular storage operation cell was full or otherwise congested, and then suggest, based on job and data storage information contained in its index cache, an alternate storage device.

Master storage manager 140 (or other network storage manager) may contain programming directed to analyzing the storage patterns and resources of its associated storage operation cells and which suggests optimal or alternate methods of performing storage operations. Thus, for example, master storage manager 140 may analyze traffic patterns in order to determine that snapshot data should be sent via a different network segment or to a different storage operation cell or storage device. In some embodiments, users may direct specific queries to master storage manager 140 regarding predicting storage operations or regarding storage operation information.

Figure 3:
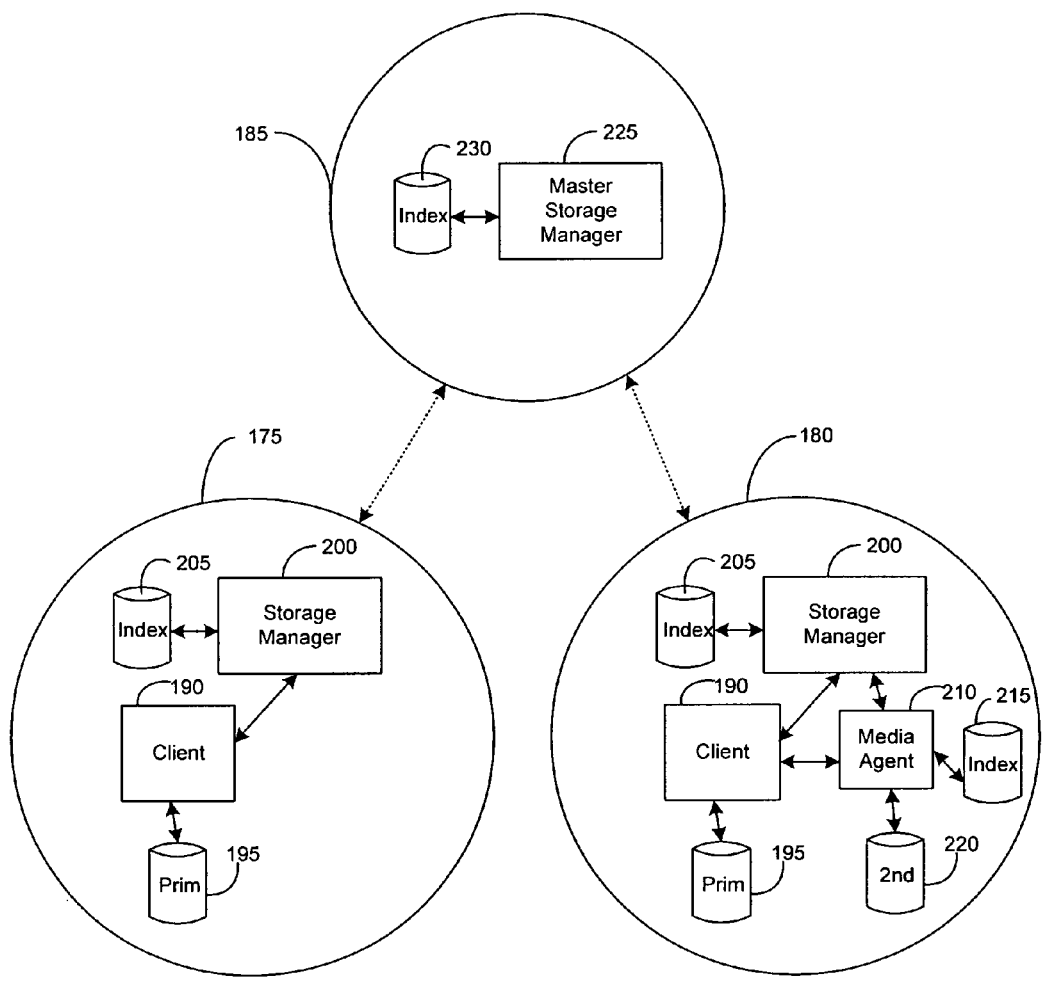
FIG. 3 is a block diagram of a hierarchically organized group of storage operation cells in a system to perform storage operations on electronic data in a computer network according to an embodiment of the invention.

FIG. 3 is a block diagram of a hierarchically organized group of storage operation cells in a system to perform storage operations on electronic data in a computer network according to an embodiment of the invention. As shown, FIG. 3 may include a first storage operation cell 175, a second storage operation cell 180, a third storage operation cell 185, a client 190 in communication with a primary volume 195 storing production or other "live" data, a storage manager component 200 in communication with a storage manager index data store 205, a media management component 210 in communication with a media management component index 215, a secondary storage device or volume 220, and a master storage manager component 225 in communication with a master storage manager index data store 230.

According to an embodiment of the invention, the first storage operation cell 175 may be directed to a particular type storage operation, such as SRM storage operations. For example, the first storage operation cell 175 may monitor and perform SRM-related calculations and operations associated with primary volume 195 data. Thus, the first storage operation cell 175 may include a client component 190 in communication with a primary volume 195 storing data. For example, client 190 may be directed to using EXCHANGE data, SQL data, ORACLE data, or other types of production data used in business applications or other applications and stored in primary volume 195. Storage manager component 200 in cell 175 may contain SRM modules or other logic directed to monitoring or otherwise interacting with attributes, characteristics, metrics, and other information associated with the data stored in primary volume 195. Storage manager 200 may track and store this information and other information in storage manager index 205. For example, in some embodiments, storage manager component 200 may track the amount of available space and other similar characteristics of data associated with primary volume 195. In some embodiments, as further described herein, storage manager component 200 may also issue alerts or take other actions when the information associated with primary volume 195 satisfies certain criteria, such as alert criteria.

The second storage operation cell 180 may be directed to another type storage operation, such as HSM storage operations. For example, second storage operation cell 180 may perform backups, migrations, snapshots, or other types of HSM-related operations known in the art. For example, in some embodiments, data may be migrated from faster and more expensive storage such as magnetic storage to less expensive storage such as tape storage.

In some embodiments, storage operation cells may also contain logical groupings of the same physical devices. Thus, the second storage operation cell 180 may include client component 190 in communication with primary volume 195 for storing data, and client component 190 and primary volume 195 in the second storage operation cell 180 may be the same physical devices as the client component 190 and primary volume 195 in the first storage operation cell 175. Similarly, in some embodiments, storage manager component 200 and index 205 in the second storage operation cell 180 may be the same physical devices as the storage manager component and index in the first storage operation cell 175. Storage manager component 200 may, however, also contain HSM modules or other logic associated with second storage operation cell 180 that may be directed to performing HSM storage operations on primary volume 195 data.

The second storage operation cell 180, therefore, may also contain a media management component 210, a media management component index 215, and a secondary storage volume 220 directed to performing HSM-related operations on primary copy data. For example, storage manager 200 may migrate primary copy data from primary volume 195 to secondary volume 220 using media management component 210. Storage manager 200 may also track and store information associated with primary copy migration and other similar HSM-related operations in storage manager index 205. For example, in some embodiments, storage manager component 200 may direct HSM storage operations on primary copy data according to a storage policy associated with primary copy 195 and stored in index 205. In some embodiments, storage manager 200 may also track where primary copy information is stored, for example, in secondary storage 220.

The third storage operation cell 185 may contain a master storage manager 225 and a master storage manager index 230. In some embodiments (not shown), additional storage operation cells may be hierarchically located between the third storage operation cell 185 and the first storage operation cell 175 or the second storage operation cell 180. In some embodiments, additional storage operation cells hierarchically superior to the third storage operation cell 185 may also be present in the hierarchy of storage operation cells.

In some embodiments, the third storage operation cell 185 may also be directed to performing a type of storage operation, such as integration of SRM and HSM data from other storage operation cells, such as first storage operation cell 175 and second storage operation cell 180. In other embodiments, the third storage operation cell 185 may also perform other types of storage operations and may also be directed to HSM, SRM, or other types of storage operations. In some embodiments, the master storage manager 225 of the third storage operation cell 185 may aggregate and process network and storage-related data provided by other manager components 200 in other storage operation cells 175 and 180 in order to provide, among other information, reporting information regarding particular cells, groups of cell, or the system as a whole.

Figure 4:
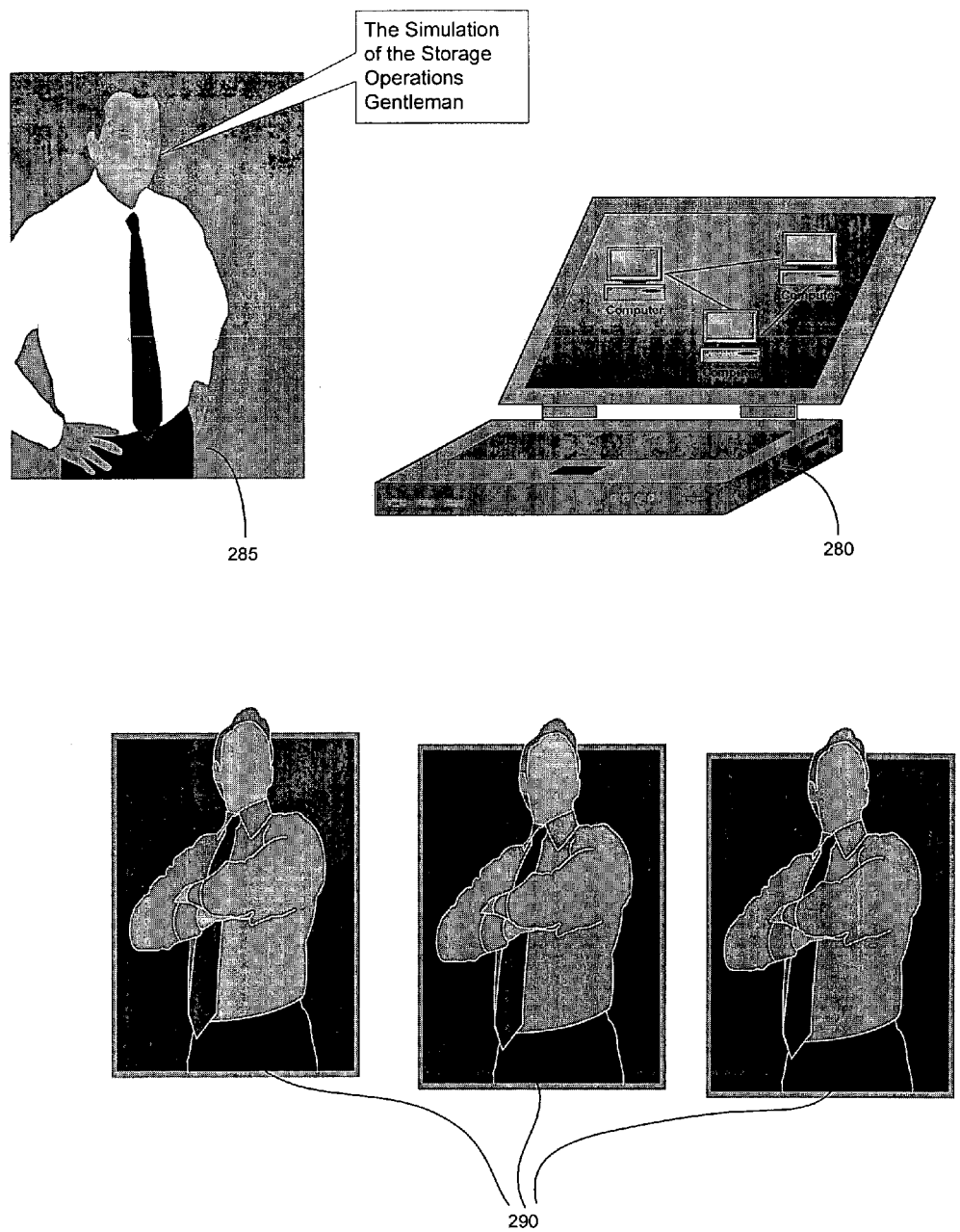
FIG. 4 is a conceptual illustration of a storage operation system simulator according to an embodiment of the invention.

FIG. 4 is a conceptual illustration of a storage operation system simulator according to an embodiment of the invention. Using the systems and components described and illustrated in relation to FIGS. 1-3, a storage operation system may be configured to operate from a single computer or processing device, such as computer device 280. In operation, computer 280 may be configured to include one or more storage operation cells for providing, for example, a sales engineer 285 with the opportunity to demonstrate the capabilities of the configured storage operation system to clients or customers 290. Since, it may be impractical and costly to use actual storage device hardware during such storage operation simulation activities, the storage operation system running on computer 280 may provide a software module such as a storage device emulation module for simulating the characteristics and operation of actual storage devices.

The present embodiment may also be used as a test bed system for evaluating the storage management capabilities of the components within a storage operation system. Thus, the one or more storage operation cells within the storage operation system may be evaluated by performing simulated storage operations prior to installing and configuring the storage operation modules on a live system that may be performing storage operations to actual storage device hardware such as tape libraries.

Figure 5:
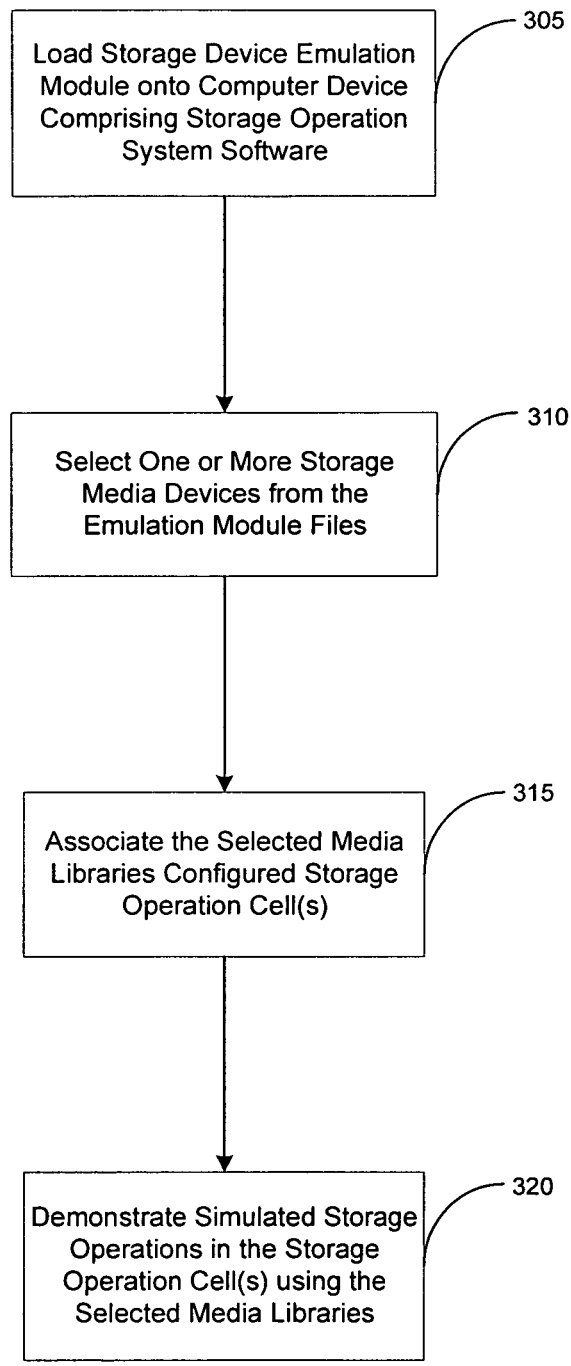
FIG. 5 is a flow diagram illustrating the general steps used for providing simulated storage operations according to an embodiment of the invention.

FIG. 5 is a flow diagram illustrating the general steps used for providing simulated storage operations according to an embodiment of the invention. At step 305, a storage device emulation module may be loaded onto a computer device that includes the necessary software modules and system requirement for configuring a storage operation system that includes one or more storage operation cells. The storage device emulation module may include software (e.g., files) that describes the behavior and characteristics of various storage media devices (e.g., tape library Storage), network pathways (e.g., bandwidth characteristics), and/or other components of a storage management system (e.g., media agents). The storage device emulation module may be an independent module that communicates with one or more components of a storage operation cell (e.g., a storage manager component). Alternatively, the storage device emulation module may be a module that resides within one or more components of a storage operation cell (e.g., a storage manager component).

At step 310, one or more storage devices may be selected from a plurality of files associated with the storage device emulation module. For example, the storage device emulation device may include a plurality of files, whereby each file (e.g., an XML file) may describe a storage library and characteristics associated with each storage drive device within the storage library. A storage drive device may, for example, include a tape drive for reading storage data from and writing storage data to tape media. Other storage libraries and media drive devices may also be described in the files associated with the storage device emulation module. Examples of such a XML library file and associated Schemas may be found in the APPENDIX section.

At step 315, using the configured storage operation cell components, the one or more selected storage device characteristics accessed from the storage device emulation module files may be associated with one or more of the components in the storage operation cells. For example, referring to FIG. 1, one of the selected simulation files associated with a storage library may be allocated to media agents 130. Although the selected file or files may, for example, emulate a storage device, the components (e.g., media management components) of the storage operation system may perform the same data input and output operations associated with storage management and storage activities (e.g., data migration, backup, etc.) as the data input and output operations that occur between these components and actual storage device hardware. Once the files emulating the storage devices have been selected (step 315), the storage operation system may simulate various data storage operations (e.g., migration, backup operations, etc.) based on the configured storage operation cells (step 320).

Figure 6:
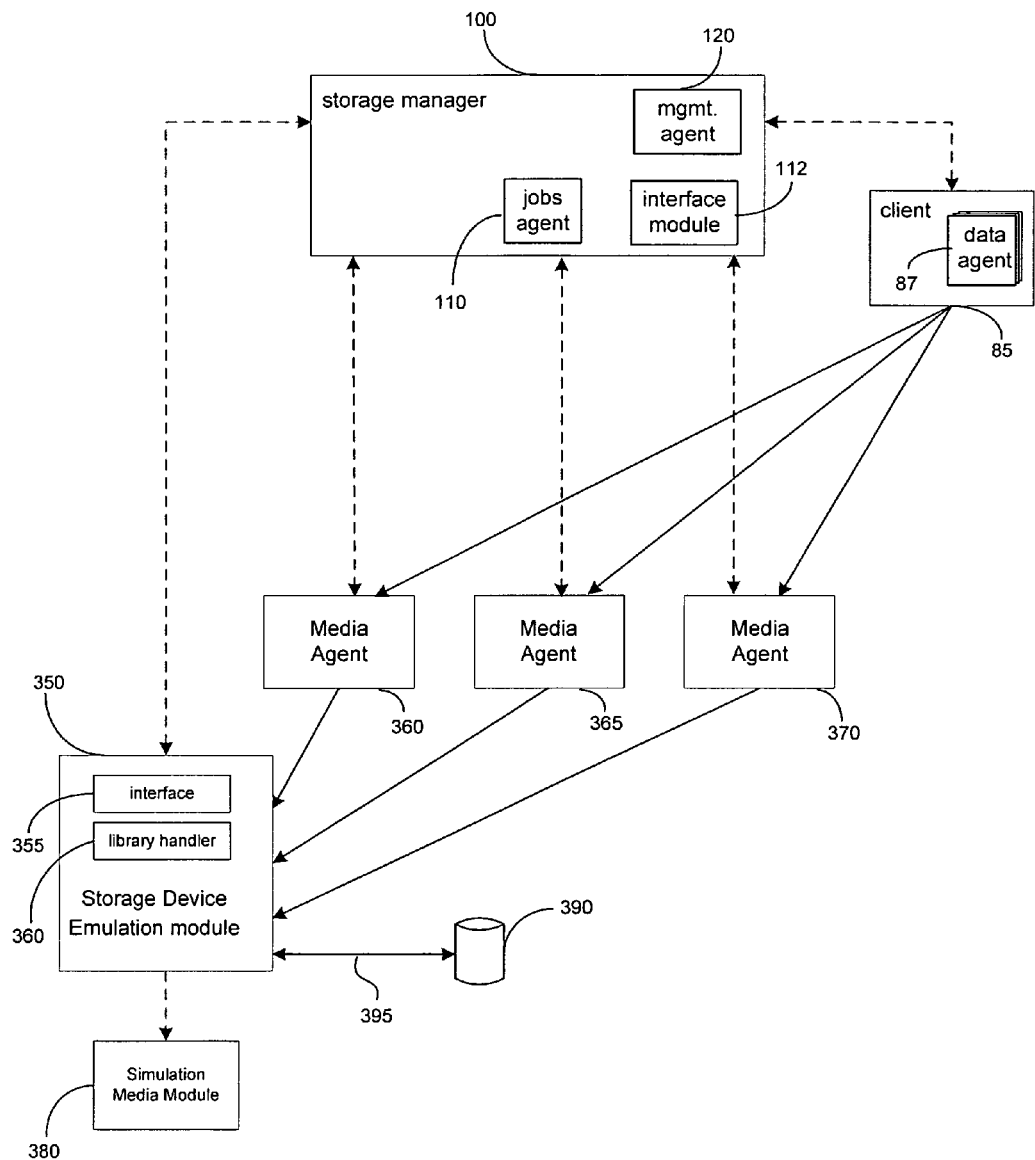
FIG. 6 is a system diagram illustrating the interaction of a storage device emulation module with other components of a storage operation cell according to an embodiment of the invention.

FIG. 6 is a system diagram illustrating the interaction of a storage device emulation module with other components of a storage operation cell according to an embodiment of the invention. Storage device emulation module 350 may include an interface 355 and a library file handler 360. In operation emulation module 350 may communicate with storage manager 100, local computer storage media (e.g., hard drive), and media agents 360, 365, and 370. Storage manager 100 may communicate with interface 255 in order to select one or more files corresponding to storage device characteristics from emulation module 350. Storage manager 100 may include an application program interface within interface module 112 for, among other things, selecting, managing, and/or configuring the files corresponding to storage device characteristics or other files representing characteristics associated with other storage operation components (e.g., media agents, network pathways or communication links etc.) Also, under the direction of storage manager 100, media agent components 360, 365, and 370 may be assigned to manage data storage operations between client 85 and the selected files in the emulation module 350. Storage device emulation module 360 may also include simulation media module 380 for providing actual data storage resources for use in the storage simulation operations performed. The data storage media may include local memory and storage (e.g., hard drive, DVD drive, external USB memory, etc.) that is found on the computer device running the storage operation system components.

The files corresponding to the storage device characteristics may include information such as an association of selected media agents with the selected files corresponding to the storage device, storage library device type (e.g., tape libraries), storage library device serial number, storage device manufacturer name, storage device model, drive type (e.g., tape drives) characteristics for each storage library device, number or drives, barcode information associated with storage media (e.g., storage tapes), information associated with a robotic arm for manipulating storage media, network address information associated with the storage library device, address or location information associated with slots and drive devices associated with the storage library device, and other information associated with the storage library device and its operation. As previously indicated, the simulation files may include characteristics associated with other storage operation modules such as media agent components and communication links (i.e., network pathways). For example, files describing media agent component characteristics may provide user-definable options of describing the behavior of a plurality of media agents based on a desired storage system configuration. For example, a user demonstrating a storage system may want to compare and contrast a difference in system performance based on the use of a different number of media agents. Also, a file describing the characteristics of a communication link may, for example, provide a user-definable option of setting the bandwidth of a communication link. For example, a user demonstrating a storage system may want to compare and contrast the affect of link bandwidth on a storage system's ability to perform storage operations.

Figure 7:
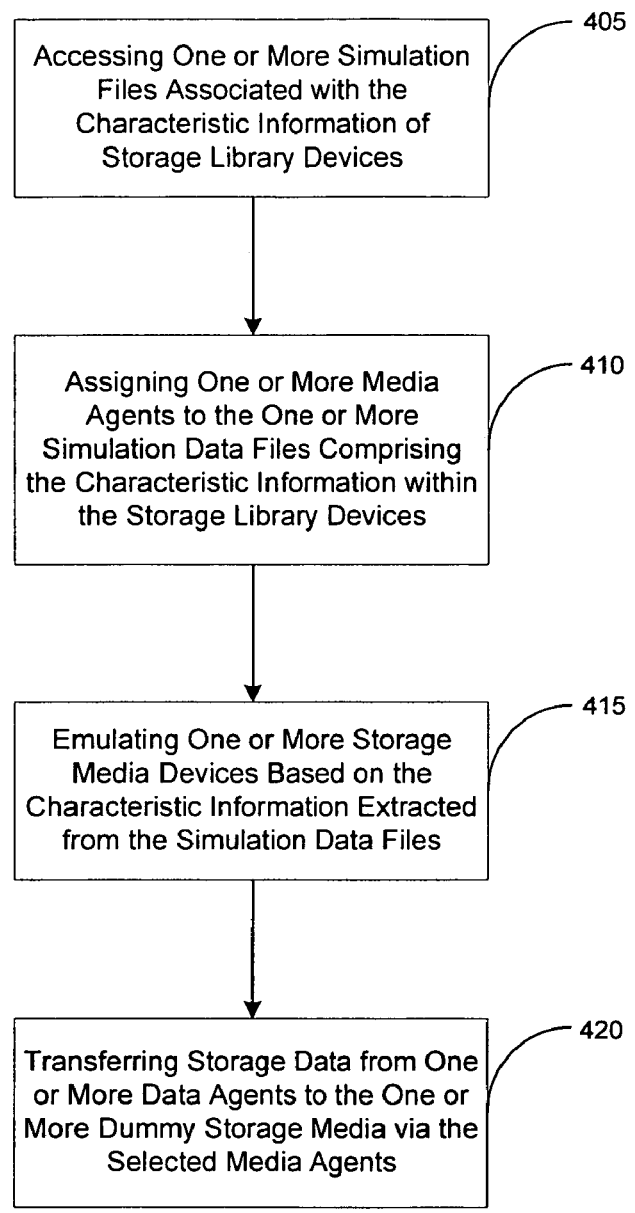
FIG. 7 is a flow diagram illustrating simulated storage operations according to an embodiment of the invention.

FIG. 7 is a flow diagram illustrating simulated storage operations according to an embodiment of the invention. The process steps illustrated in FIG. 7 may be described in relation to the exemplary embodiment of FIG. 6. At step 405, one or more simulation data files that include characteristic information associated with storage device hardware may be selected from storage emulation module 350 by storage manager 100. Storage manager 100 may select these simulation data files by communicating with interface 355 via, for example, an application program interface (API) associated with interface module 112. Once storage manager 100 selects the simulation data files via interface 355, library handler 360 may access and send these files to the storage manager 100. Storage manager 100 may then assign one or more media agents to each of the selected files based on the type of storage device the media agent is communicating with during the simulated storage operations (step 410).

For example, based on an accessed file corresponding to a tape library having six tape drives, storage manager 100 may assign media agent 365. Thus, media agent 365 may facilitate and manage communications to the tape library without necessarily being aware that a physical tape library is present. In this manner, storage manager 100 may assign logical associations between media agents and the simulation files accessed from storage device emulation module 360. The simulation files may be accessed from storage or memory available on the same device as the storage device emulation module 360. Alternatively, the simulation files may be accessed from a remote storage device or database 390 over network 395. Storage manager 100 may also access simulation files and other simulation related information from other storage managers at other storage operation cells.

At step 415, one or more storage media devices are emulated based on the characteristic information extracted from the selected one or more simulation files. For example, based on each selected simulation file, the emulation model may allocate a particular directory location or target corresponding to one of the local memory storage devices (e.g., hard drive) associated with a computer device (e.g., laptop computer) on which the storage operation system may be running.

For example, the emulation device may assign a directory called "tape library storage 1" on the C:\drive. The emulator module may then provide information associated with the location of the target directory (i.e., "tape library storage 1") to storage manager 100. Storage manager 100 may then provide the information associated with the location of the target directory to the assigned media agent (e.g., media agent 360). Under the direction of storage manager 100 assigned media agent 360 may, for example, send client 85 data to the target directory named "tape library storage 1" via the designated media agent (step 420). For purposes of simulation, the client 85 data may, for example, be accessed from one or more data files containing different data types. A different data agent 87 may then be responsible for handling each of the different data types accessed from each of the data files.

Instead of emulation module 350 writing client 85 data to a location in local memory, emulation module 350 may alternatively provide a target file for write processes. An example of such a file may be a /dev/null or null device used in UNIX operating systems, or an equivalent WINDOWS null. Therefore, although a target for a write operation is provided, data may not be written anywhere. This allows for the emulation module 350 to simulate a storage device without unnecessarily occupying system resources with such write operations.

The simulation data files that include characteristic information associated with storage device hardware may also include optional fault condition simulation data for testing the storage operation system's fault recovery capabilities. For example, based on information in the simulation files, emulator 350 may generate information that storage manager 100 may receive under fault conditions. For example, a simulation file may include conditional fault generation code, whereby based on a condition such as the target directory (e.g., "tape library storage 1") receiving a certain threshold of data capacity, emulation module 350 may send storage manager 100 "an out of storage capacity" message to simulate a storage device reaching its data capacity. This may enable storage manager 100 to apply redundancy procedures such as failover conditions, where storage data may be sent to another target directory via, for example, a different media agent in order to simulate sending the data to another redundant storage device.

Systems and modules described herein may comprise software, firmware, hardware, or any combination(s) of software, firmware, hardware, or other means suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes, methods, or means, or any combinations thereof, suitable for the purposes described herein. User interface elements described herein may comprise elements from graphical user interfaces, command line interfaces, physical interfaces, and other interfaces suitable for the purposes described herein. Screenshots presented and described herein can be displayed differently as known in the art to generally input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX

Exemplary Library Schema

<?xml version="1.0" encoding="UTF-8"?>
<xs:schema xmlns:xs="http://www.w3.org/2001/XMLSchema" elementFormDefault="qualified" attributeFormDefault="unqualified">
  <xs:include schemaLocation=".\MediaAgents.xsd"/>
  <xs:element name="Devices">
  <xs:annotation>
    <xs:documentation>Lists all devices present in a library</xs:documentation>
  </xs:annotation>
  <xs:complexType>
    <xs:sequence>
      <xs:annotation>
        <xs:documentation>Need atleast a library or Drives</xs:documentation>
      </xs:annotation>
      <xs:element name="Library" type="LibraryType" minOccurs="0">
        <xs:annotation>

```
        <xs:documentation>May not be present</xs:
            documentation>
    </xs:annotation>
</xs:element>
<xs:element    ref="Drive"    minOccurs="0"
    maxOccurs="unbounded"/>
    </xs:sequence>
</xs:complexType>
</xs:element>
<xs:complexType name="LibraryType">
<xs:sequence>
    <xs:element ref="SerialNumber">
        <xs:annotation>
            <xs:documentation>Uniquely identifies the arm
                changer</xs:documentation>
        </xs:annotation>
    </xs:element>
    <xs:element ref="Manufacturer"/>
    <xs:element ref="Model"/>
    <xs:element name="DriveCount" type="xs:integer"
        default="1" nillable="false"/>
    <xs:element ref="Drive" maxOccurs="unbounded">
        <xs:annotation>
            <xs:documentation>Are different from drives in
                the standalone drives</xs:documentation>
        </xs:annotation>
    </xs:element>
    <xs:element    name="Slots"    type="SlotType"
        maxOccurs="unbounded"/>
    <xs:element ref="MediaAgents"/>
</xs:sequence>
<xs:attribute    name="Name"    type="xs:
    string" use="required"/>
</xs:complexType>
<xs:complexType name="DriveType">
<xs:sequence id="1" minOccurs="0">
    <xs:element ref="SerialNumber"/>
    <xs:element ref="Model"/>
    <xs:element ref="Manufacturer"/>
    <xs:element ref="BaseAddress"/>
    <xs:element ref="BarCode"/>
    <xs:element ref="MediaAgents"/>
</xs:sequence>
<xs:attribute    name="Name"    type="xs:string"
    use="required"/>
<xs:attribute    name="IsOccupied"    type="xs:boolean"
    use="required"/>
</xs:complexType>
<xs:complexType name="SlotType">
<xs:sequence>
    <xs:element ref="BaseAddress"/>
    <xs:element ref="BarCode"/>
</xs:sequence>
<xs:attribute    name="IsMailSlot"    type="xs:boolean"
    use="required"/>
<xs:attribute    name="Name"    type="xs:string"
    use="required"/>
<xs:attribute    name="IsOccupied"    type="xs:boolean"
    use="required"/>
</xs:complexType>
<xs:attribute name="IsMailSlot" type="xs:boolean"/>
<xs:attribute name="IsOccupied"/>
<xs:attribute name="Name" type="xs:string"/>
<xs:element    name="BarCode"    type="xs:string"
    nillable="true"/>
<xs:element name="Manufacturer" type="xs:string"/>
<xs:element name="Model" type="xs:string"/>
<xs:element    name="SerialNumber"    type="xs:string"
    nillable="false">
    <xs:annotation>
        <xs:documentation>Uniquely identifies the Device</
            xs:documentation>
    </xs:annotation>
</xs:element>
<xs:element    name="BaseAddress"    type="xs:string"
    nillable="false"/>
<xs:element name="Drive" type="DriveType"/>
</xs:schema>
Exemplary MediaAgent List schema
<?xml version="1.0" encoding="UTF-8"?>
<xs:schema    xmlns:xs="http://www.w3.org/2001/
    XMLSchema"    elementFormDefault="qualified"
    attributeFormDefault="unqualified">
    <xs:element name="MediaAgents">
        <xs:complexType>
            <xs:sequence>
                <xs:element    name="MediaAgent"
                    type="MediaAgent" maxOccurs="unbounded"/>
            </xs:sequence>
        </xs:complexType>
    </xs:element>
    <xs:attribute name="MAName" type="xs:string"/>
    <xs:complexType name="MediaAgent">
        <xs:attribute    name="MAName"    type="xs:string"
            use="required"/>
    </xs:complexType>
</xs:schema>
Exemplary XML Document Describing a Library
<?xml version="1.0" encoding="UTF-8"?>
<!--Sample XML file generated by XMLSPY v5 rel. 2 U
(http://www.xmlspy.com)-->
<Devices    xmlns:xsi="http://www.w3.org/2001/
XMLSchema-instance"    xsi:
noNamespaceSchemaLocation="E:XMLSamplesDevice-
s.xsd">
    <Library Name="LibraryName">
        <SerialNumber>00001</SerialNumber>
        <Manufacturer>ADIC</Manufacturer>
        <Model>Scalar 100</Model>
        <DriveCount>2</DriveCount>
        <Drive Name="Drive1" IsOccupied="0">
            <SerialNumber>0000002</SerialNumber>
            <Model>DLT7000</Model>
            <Manufacturer>ADIC</Manufacturer>
            <BaseAddress>0x01</BaseAddress>
            <BarCode></BarCode>
            <MediaAgents>
                <MediaAgent
                    MAName="gaul.gp.cv.commvault.com"/>
                <MediaAgent
                    MAName="asterix.gp.cv.commvault.com"/>
            </MediaAgents>
        </Drive>
        <Drive Name="Drive2" IsOccupied="0">
            <SerialNumber>0000003</SerialNumber>
            <Model>DLT7000</Model>
            <Manufacturer>ADIC</Manufacturer>
            <BaseAddress>0x02</BaseAddress>
            <BarCode></BarCode>
            <MediaAgents>
```

```
        <MediaAgent
            MAName="gaul.gp.cv.commvault.com"/>
        <MediaAgent
            MAName="asterix.gp.cv.commvault.com"/>
    </MediaAgents>
</Drive>
<Slots  IsMailSlot="false"  Name="Slot1"  IsOccupied="1">
    <BaseAddress>0x05</BaseAddress>
    <BarCode>B000001</BarCode>
</Slots>
<Slots  IsMailSlot="false"  Name="Slot1"  IsOccupied="1">
    <BaseAddress>0x06</BaseAddress>
    <BarCode>B000002</BarCode>
</Slots>
<Slots  IsMailSlot="false"  Name="Slot1"  IsOccupied="1">
    <BaseAddress>0x07</BaseAddress>
    <BarCode>B000003</BarCode>
</Slots>
<Slots  IsMailSlot="false"  Name="Slot1"  IsOccupied="1">
    <BaseAddress>0x08</BaseAddress>
    <BarCode>B000004</BarCode>
</Slots>
<Slots  IsMailSlot="false"  Name="Slot1"  IsOccupied="1">
    <BaseAddress>0x09</BaseAddress>
    <BarCode>B000005</BarCode>
</Slots>
<Slots   IsMailSlot="false"   Name="Slot1"
    IsOccupied="false">
    <BaseAddress>0x0A</BaseAddress>
    <BarCode></BarCode>
</Slots>
<Slots   IsMailSlot="false"   Name="Slot1"
    IsOccupied="false">
    <BaseAddress>0x0B</BaseAddress>
    <BarCode></BarCode>
</Slots>
<Slots   IsMailSlot="false"   Name="Slot1"
    IsOccupied="false">
    <BaseAddress>0x0C</BaseAddress>
    <BarCode></BarCode>
</Slots>
<Slots    IsMailSlot="true"    Name="Slot1"
    IsOccupied="false">
    <BaseAddress>0x0D</BaseAddress>
    <BarCode></BarCode>
</Slots>
<Slots    IsMailSlot="true"    Name="Slot1"
    IsOccupied="false">
    <BaseAddress>0x0E</BaseAddress>
    <BarCode></BarCode>
</Slots>
<MediaAgents>
    <MediaAgent
        MAName="gaul.gp.cv.commvault.com"/>
    <MediaAgent
        MAName="asterix.gp.cv.commvault.com"/>
</MediaAgents>
</Library>
<Drive Name="Drive5" IsOccupied="0">
<SerialNumber>0000010</SerialNumber>
<Model>DLT7000</Model>
<Manufacturer>ADIC</Manufacturer>
<BaseAddress></BaseAddress>
<BarCode></BarCode>
<MediaAgents>
    <MediaAgent
        MAName="gaul.gp.cv.commvault.com"/>
    <MediaAgent
        MAName="asterix.gp.cv.commvault.com"/>
</MediaAgents>
</Drive>
<Drive Name="Drive6" IsOccupied="0">
<SerialNumber>0000011</SerialNumber>
<Model>DLT7000</Model>
<Manufacturer>ADIC</Manufacturer>
<BaseAddress></BaseAddress>
<BarCode></BarCode>
<MediaAgents>
    <MediaAgent
        MANane="gaul.gp.cv.commvault.com"/>
    <MediaAgent
        MAName="asterix.gp.cv.commvault.com"/>
<MediaAgents>
</Drive>
</Devices>
```

What is claimed is:

1. A computing system for simulating data storage operations for testing and evaluating components of a storage operation system in a computer network, the computing system comprising:

one or more computers each comprising:

one or more processors; and a memory storing a program of instructions to be executed by the one or more processors;

the program of instructions stored in the memory of the computers comprising:

at least one virtual data agent component assigned to obtain application-specific data from an application for execution on one or more of the computers, the virtual data agent being implemented with a plurality of data-type specific data agents that obtain different types of data from the application;

a plurality of different media management components for execution on one or more of the computers, in communication with the virtual data agent component to receive the application-specific data obtained by the virtual data agent, wherein the different media management components are configured to communicate with and perform storage operations on different types of storage devices;

a storage device emulation module for execution on one of the computers, the storage device emulation module comprising a plurality of different types of simulated storage devices to simulate characteristics of the different types of storage devices; and a storage manager component in communication with the virtual data agent, the storage device emulation module, and the media management components;

wherein when the program of instructions is executed by the one or more processors in the one or more computers:

the virtual data agent component obtains application-specific data from an application executing on one or more of the computers and identifies storage policy, preferences and criteria indicating the type of storage device to be used to store the data;

the storage device emulation module provides characteristics of the different types of simulated storage devices provided by the storage device emulation module;

the storage manager component assigns the different media management components to the different types of simulated storage devices based on the type of storage device to be used to store the data and the characteristics of the different types of simulated storage devices provided by the storage device emulation module;

the storage device emulation module executing on one of the computers, simulates different types of storage devices using different types of simulated storage devices;

once assigned by the storage manager component, the different media management components are in communication with the at least one virtual data agent and the different types of simulated storage devices, and receiving the data from the virtual data agent and directing storage operations on different types of simulated storage devices; and the different types of simulated storage devices, under direction of the storage manager component, simulate storage operations associated with the data generated by the virtual data agent on the different types of simulated storage devices, thereby testing and evaluating components of the storage operation system in the computer network.

2. The computing system according to claim 1, wherein the storage device emulation module comprises at least one file describing characteristics of at least one storage device.

3. The computing system according to claim 2, wherein the characteristics comprise a storage device serial number.

4. The computing system according to claim 2, wherein the characteristics comprise a manufacturer name associated with the at least one storage device.

5. The computing system according to claim 2, wherein the characteristics comprise network address information associated with the at least one storage device.

6. The computing system according to claim 2, wherein the characteristics comprise barcode information associated with the at least one storage device.

7. A computer implemented method of simulating data storage operations for testing and evaluating components of a storage operation system in a computer network, the method comprising:

obtaining, by at least one virtual data agent component executing on one or more computers, application-specific data from an application executing on one or more of the computers and identifying storage policy, preferences and criteria indicating type of storage device to be used to store the data;

a storage device emulation module executing on one of the computers providing characteristics of the different types of simulated storage devices provided by the storage device emulation module;

a storage manager component executing on one of the computers assigning the different media management components to the different types of simulated storage devices based on the type of storage device to be used to store the data and the characteristics of the different types of simulated storage devices provided by the storage device emulation module;

the storage device emulation module executing on one of the computers, simulating different types of storage devices using different types of simulated storage devices;

once assigned by the storage manager component, the different media management components being in communication with the at least one virtual data agent and the different types of simulated storage devices, and receiving the data from the virtual data agent and directing storage operations on different types of simulated storage devices; and the different types of simulated storage devices, under direction of the storage manager component, simulating storage operations associated with the data generated by the virtual data agent on the different types of simulated storage devices, thereby testing and evaluating components of the storage operation system in the computer network.

8. The method according to claim 7, wherein the characteristics of the plurality of different types of simulated storage devices are stored in at least one electronic file comprising an XML file.

9. The method according to claim 8, further comprising accessing simulation information from the at least one electronic file.

10. The method according to claim 9, wherein the accessed simulation information comprises information associated with at least one slot associated with the storage device.

11. The method according to claim 10, wherein the at least one slot comprises network address information.

12. The method according to claim 10, wherein the information associated with at least one slot comprises barcode information.

13. The method according to claim 9, wherein the accessed simulation information comprises information associated with at least one storage drive device.

14. The method according to claim 13, wherein the information associated with the at least one storage drive device comprises information associated with at least one of the group consisting of: a storage drive device serial number, a storage drive device model number, and a storage drive device manufacturer.

15. The method according to claim 14, wherein the at least one storage drive device comprises a tape drive device.

16. The method according to claim 15, wherein the tape drive device comprises network address information.

17. The method according to claim 7, wherein simulating a storage operation between the media management component and the plurality of different types of simulated storage devices comprises sending data from one computer device to a storage device connected to the computer device based on the accessed attributes of the different types of simulated storage devices.

18. The method according to claim 17, wherein the storage device comprises a computer hard-drive memory associated with the computer device.

19. The method according to claim 7, wherein simulating a storage operation between the media management component and the plurality of different types of simulated storage devices comprises sending data from the computer device to another file based on the accessed attributes of the plurality of different types of simulated storage devices.

20. The method according to claim 19, wherein the another file discards the sent data from the computer device.

* * * * *